(12) United States Patent
West et al.

(10) Patent No.: US 8,397,167 B2
(45) Date of Patent: Mar. 12, 2013

(54) SYSTEM AND METHOD FOR A REMOTE CONSOLE PREVIEW OF A SERVER

(75) Inventors: Ryan T. West, Round Rock, TX (US); Brian M. Doty, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 626 days.

(21) Appl. No.: 12/543,188

(22) Filed: Aug. 18, 2009

(65) Prior Publication Data
US 2011/0047472 A1 Feb. 24, 2011

(51) Int. Cl.
*G06F 3/00* (2006.01)
*G06F 3/048* (2006.01)

(52) U.S. Cl. ........ 715/740; 715/838; 715/781; 715/810; 715/736; 709/217; 709/219; 709/224

(58) Field of Classification Search ................. 715/719, 715/733, 734, 736, 740, 763, 781, 810, 835, 715/846, 838; 709/203, 204, 217, 218, 219, 709/223, 224; 702/188
See application file for complete search history.

(56) References Cited

U.S. PATENT DOCUMENTS

| | | | |
|---|---|---|---|
| 5,440,699 A | 8/1995 | Farrand et al. | |
| 5,999,938 A * | 12/1999 | Bliss et al. .............................. | 1/1 |
| 6,463,343 B1 * | 10/2002 | Emens et al. .................... | 700/83 |
| 6,560,641 B1 | 5/2003 | Powderly et al. | |
| 7,634,793 B2 * | 12/2009 | Hunleth et al. .................. | 725/54 |
| 7,673,015 B2 * | 3/2010 | Sakai et al. .................... | 709/217 |
| 8,019,849 B1 * | 9/2011 | Lopilato et al. ............... | 709/223 |
| 2007/0088796 A1 | 4/2007 | Liu et al. | |
| 2009/0013414 A1 * | 1/2009 | Washington et al. ........... | 726/32 |
| 2010/0057956 A1 * | 3/2010 | Blackwell et al. .............. | 710/74 |
| 2010/0271479 A1 * | 10/2010 | Heydlauf ...................... | 348/143 |

* cited by examiner

*Primary Examiner* — Xiomar L Bautista
(74) *Attorney, Agent, or Firm* — Larson Newman, LLP

(57) ABSTRACT

A device and a method for a remote console preview of a remote server are disclosed. A preview image corresponding to a remote console image of the remote server is displayed. The preview image is updated at a predetermined time interval. A first selection of the preview image is received, and a remote console session of the remote server is initiated in response to receiving the first selection of the preview image.

20 Claims, 6 Drawing Sheets

US 8,397,167 B2

SYSTEM AND METHOD FOR A REMOTE CONSOLE PREVIEW OF A SERVER

FIELD OF THE DISCLOSURE

This disclosure relates generally to information handling systems, and more particularly relates to a system and method for a remote console preview of a server.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Users and/or administrators can remotely access a server to check the status of the server, update the server, and/or repair the server. The user can be provided with an application that can allow the user to remotely log on to the server. Upon remotely logging on to the server the user can view a graphical user interface (GUI) associated with the server that can be substantially similar to the GUI that would be displayed on a monitor physically connected to the server.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
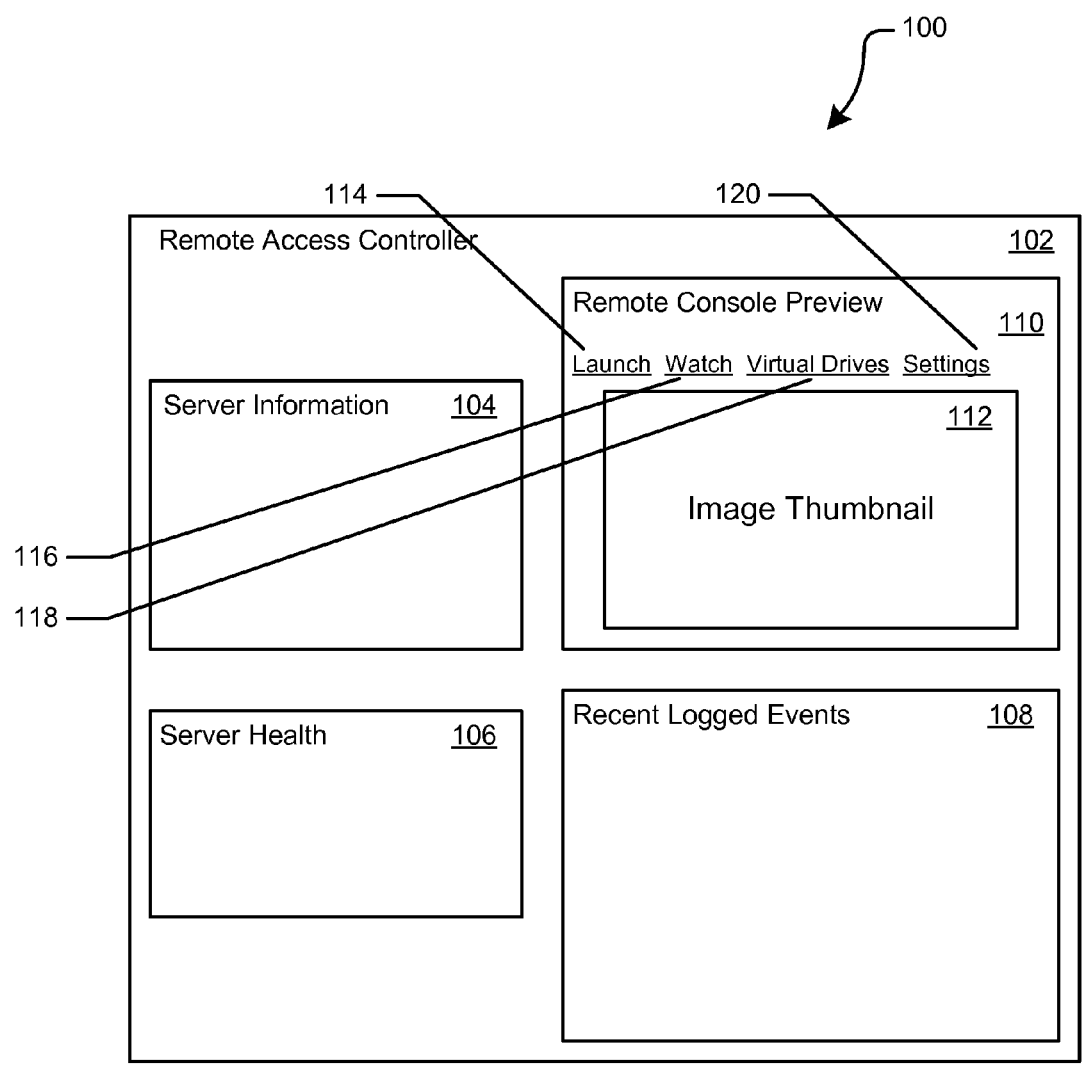
FIG. 1 is an exemplary screen shot of a remote access controller for a server.
Figure 2:
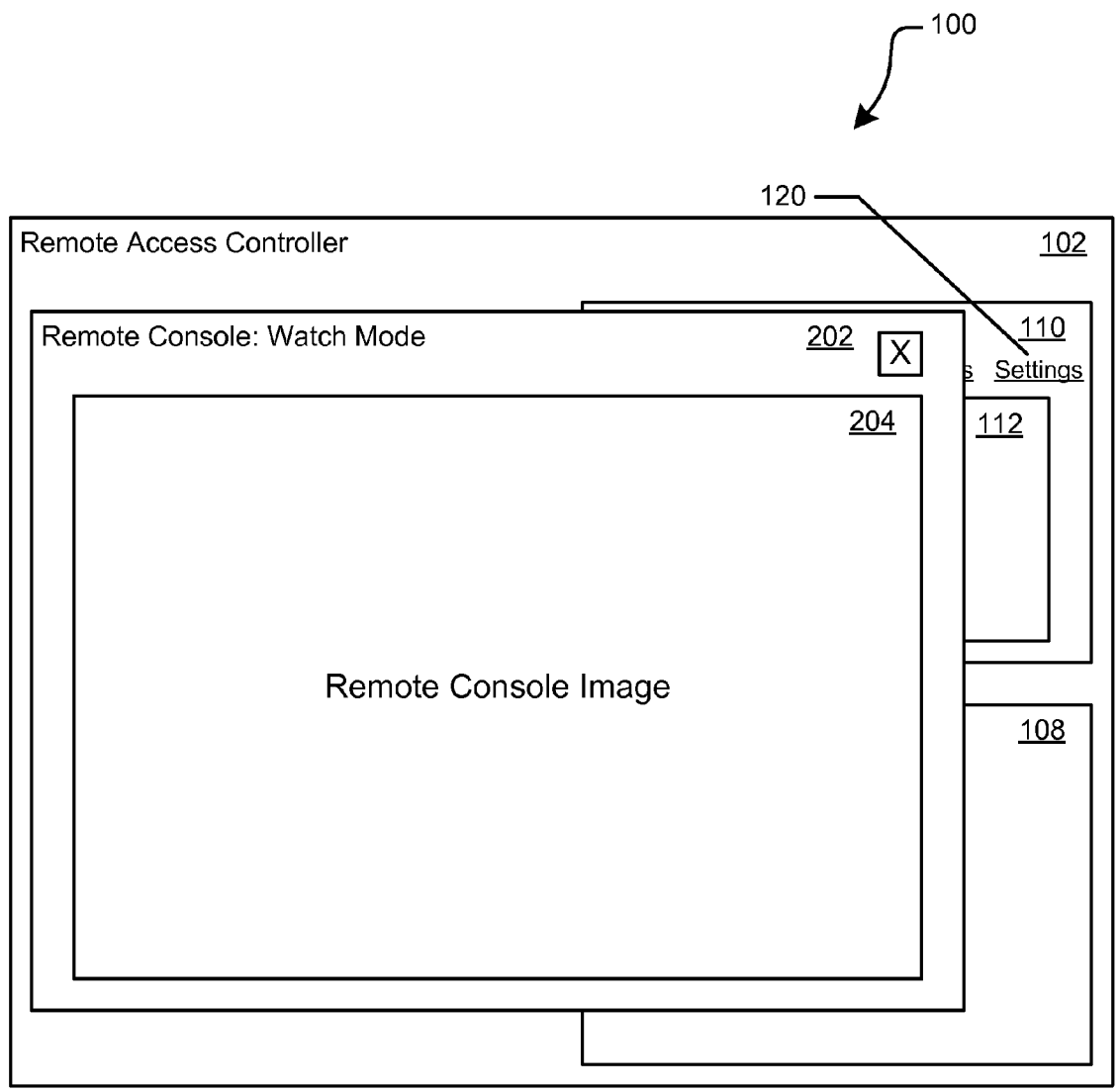
FIG. 2 is an exemplary screen shot of a remote console viewer of the remote access controller for the server.
Figure 3:
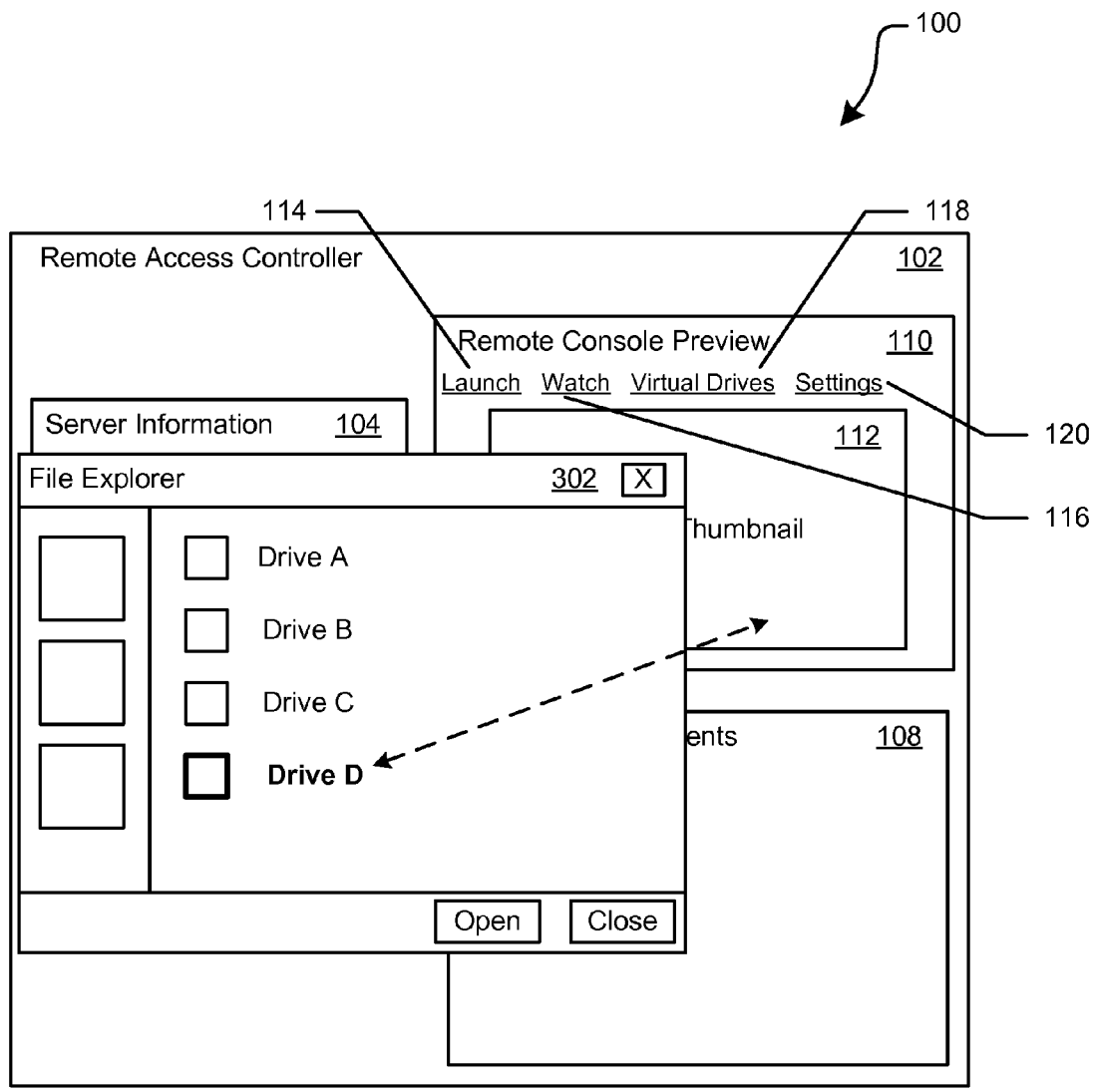
FIG. 3 is another exemplary screen shot of the remote access controller for the server.

FIGS. 1, 2 and 3 show screen shots of a remote access controller 100 of an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The remote access controller 100 includes a graphical user interface (GUI) 102 having a server information menu 104, a server health menu 106, a recent logged events menu 108, and a remote console preview 110. A user can utilize the remote access controller 100 to access a remote server. The server information menu 104 can provide the user with information associated with the remote server, such as its power state, its hostname, its operating system, its Internet Protocol (IP) address, its basic input/output system (BIOS) firmware, and the like. Additionally, the server information menu 104 can provide the user with an IP address associated with the last user to log on to the server, the time/date of the last log on, the time/date that the information associated with the remote server was determined, and the like. The user can utilize the information located within the server information menu 104 to get an overview of the remote server. The server health menu 106 can provide the user with the temperature of the remote server. The server health menu 106 can also provide the user with information about different components within the remote server, such as the fans, power supplies, processor, network interface card, and the like. The server health menu 106 can indicate whether the components are working properly. For example, if the components are working properly, the server health menu 106 can include an 'OK' text next to the component. However, if a component has failed, the server health menu 106 can include a component error and/or diagnostic message next to the component.

The recent logged events menu 108 can provide the user with a list of recent events associated with the entire remote server, such as server error messages, server warning messages, server update messages, and the like. The remote console preview 110 includes an image thumbnail 112, a launch link 114, a watch link 116, a virtual drives link 118, and a settings link 120 discussed below. The image thumbnail 112 can provide the user with an image pulled from a video card of the remote server. The image pulled from the video card is preferably the image that the video card has generated in response to actions performed by the remote server. This image is preferably generated by the video card and then transmitted to a display screen or monitor so that the user can view a graphical representation of the processes being performed by the remote server.

For example, an exemplary image thumbnail 112 can show a sample of the video card's live output, such as a login screen, a list of command lines, a blue screen, and the like. The login screen being displayed as the image thumbnail 112 can indicate that the remote server is working properly, and that the user can log on to and update the remote server. The list of command lines being displayed as the image thumbnail 112 can indicate that the remote server is in a booting process and that the remote server may be available shortly. If the image thumbnail 112 shows a blue screen, it can be an indication that the remote server has experienced a failure and is not available.

The image thumbnail 112 can be located on the homepage of the remote access controller 100, and can be updated at periodic intervals. The remote access controller 100 can automatically access the video card of the remote server to provide the image thumbnail 112 to the user without the user having to launch a remote access login for the remote server. The image thumbnail 112 can provide a visual indication of the status of the remote server. For example, if the user sees a blue screen in the image thumbnail 112, the user can determine that a failure has occurred with the remote server and the user can then view the server health menu 106 and the recent logged events menu 108 to determine any possible problems with the remote server.

If the user wants to log in to the remote server, the user can either click on the image thumbnail 112 or can click on the launch link 114. These actions can provide the user with a login screen to access the remote server. However, if the user wants a closer look at the image of the remote server shown in the image thumbnail 112 without launching the login screen for the remote server, the user can click on the watch link 116. When the watch link 116 is selected, a remote console watch mode window 202 can be opened on the GUI 102, as shown in FIG. 2.

The remote console watch mode window 202 can include a remote console image 204 that can display the image from the video card of the remote server. The remote console image 204 is preferably larger than the image thumbnail 112, such that the user can distinguish between different text, icons, and the like of the image from the video card of the remote server. While the remote console image 204 is displayed in the remote console watch mode window 202, the user is provided with a closer view of the image but cannot log on to the remote server and/or update the remote server. Thus, the remote console watch mode window 202 preferably provides the user with the ability to view the remote console image 204 without interacting with the remote server. Additionally, the image thumbnail 112 can be enlarged when a pointing device, such as a mouse, a track ball, and the like, dwells over the image thumbnail for a predetermined amount of time. The predetermined amount of time can be any amount of time set in the remote access controller 100, such as five seconds, ten seconds, and the like.

The remote console image 204 can preferably be updated at periodic time intervals in the same manner as the image thumbnail 112. The time period for updating the remote console image 204 and the image thumbnail 112 can be pre-set in the remote access controller 100 and/or can be set by the user via the settings link 120. The user can also utilize the settings link 120 to change other aspects of the GUI 102, such as the information listed in the server health menu 106, the number of events stored in the recent logged events menu 108, and the like.

Returning to FIG. 1, the user can provide virtual drives to the remote server by selecting the virtual drives link 118 to open a file explorer 302 on the GUI 102, as shown in FIG. 3. The file explorer 302 can provide the user with a plurality of drives and/or media sources that are available for use by the remote server, such as drives A, B, C, and D. Each of the drives can be a drive located on the user's computer, such as an internal hard disk drive, a universal serial bus (USB) drive, a compact disk (CD) drive, and the like. The drives A, B, C, and D can be installed as virtual drives of the remote server, such that upon installation the remote server can use the virtual drive in the same way as a drive physically connected to the remote server.

For example, if the user wants to use a CD drive, labeled as drive D on his local computer, to install software on the remote server, the user can install the CD drive as a virtual drive on the remote server. The drive can be installed as a virtual drive on the remote server by dragging an icon associated with the drive from the file explorer 302 to the image thumbnail 112, as indicated by the dashed line in FIG. 3 between drive D and the image thumbnail. When the icon is dropped on the thumbnail image 112, the drive can be mapped to the remote server as a virtual drive and the user can then load an application on the remote server via the virtual drive D.

Figure 4:
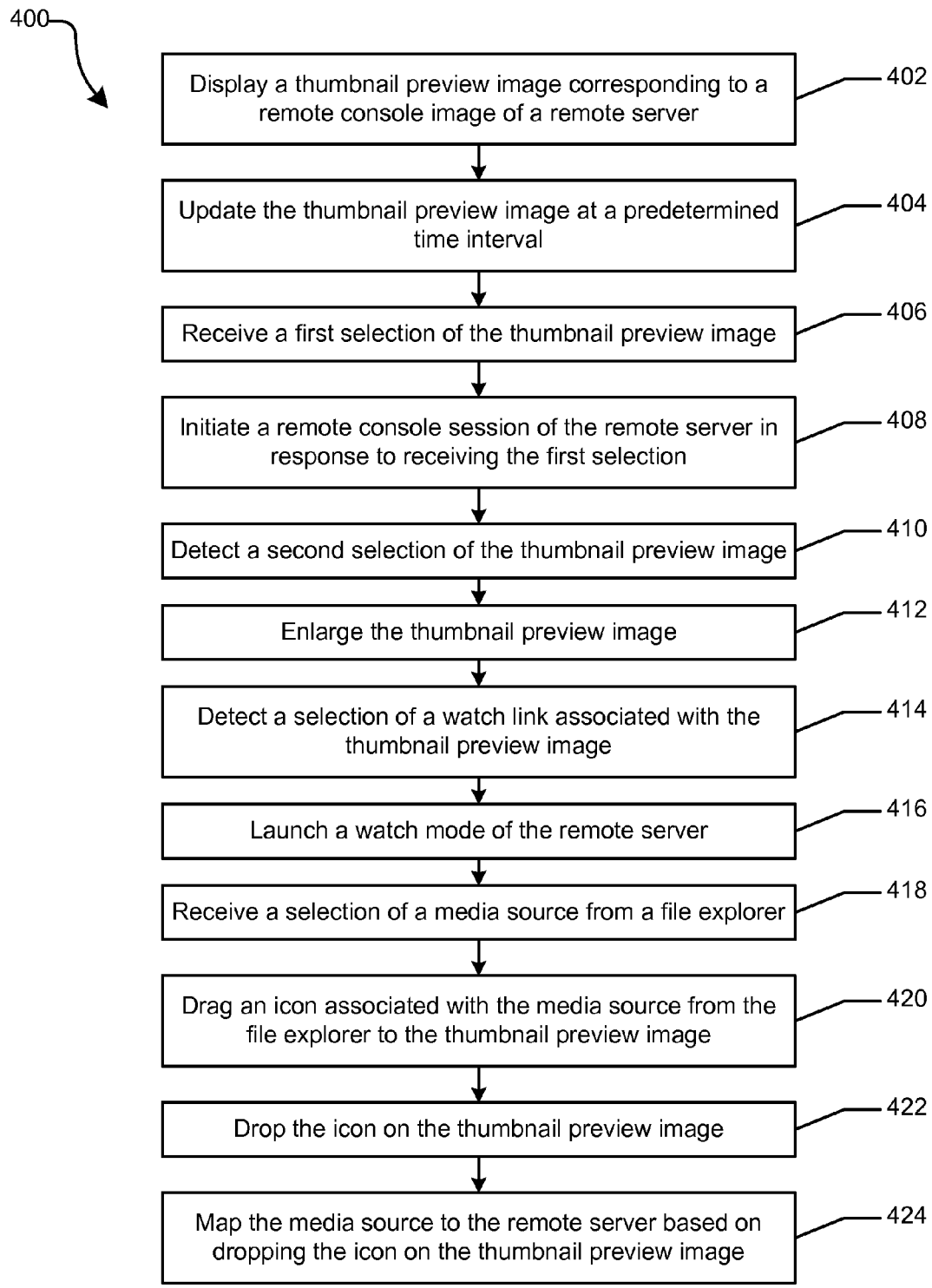
FIG. 4 is a flow diagram of a method for launching a remote console session of the server.

FIG. 4 shows a method 400 for launching a remote console session of a server. At block 402, a thumbnail preview image corresponding to a remote console image of a remote server is displayed. The thumbnail preview image is updated at a predetermined time interval at block 404. At block 406, a first selection of the thumbnail preview image is received. A remote console session of the remote server is initiated in response to receiving the first selection of the thumbnail preview image at block 408. At block 410, a second selection of the thumbnail preview image is detected. The thumbnail preview image is enlarged in response to detecting the second selection of the thumbnail preview image at block 412. The second selection of the thumbnail preview image can be a graphical representation of a pointing device dwelling over the thumbnail preview image for a predetermined amount of time, such as five seconds, ten seconds, and the like.

At block 414, a selection of a watch link associated with the thumbnail preview image is detected. A watch mode of the remote console image of the remote server is launched in response to the selection of the watch link at block 416. At block 418, a selection of a media source from a file explorer is received. The media source can be a drive located on the user's computer, such as an internal hard disk drive, a USB drive, a CD drive, and the like. An icon associated with the media source from the file explorer is dragged to the thumbnail preview image at block 420. At block 422, the icon is dropped on the thumbnail preview image. The media source is mapped to the server based on dropping the icon on the thumbnail preview image at block 424.

Figure 5:
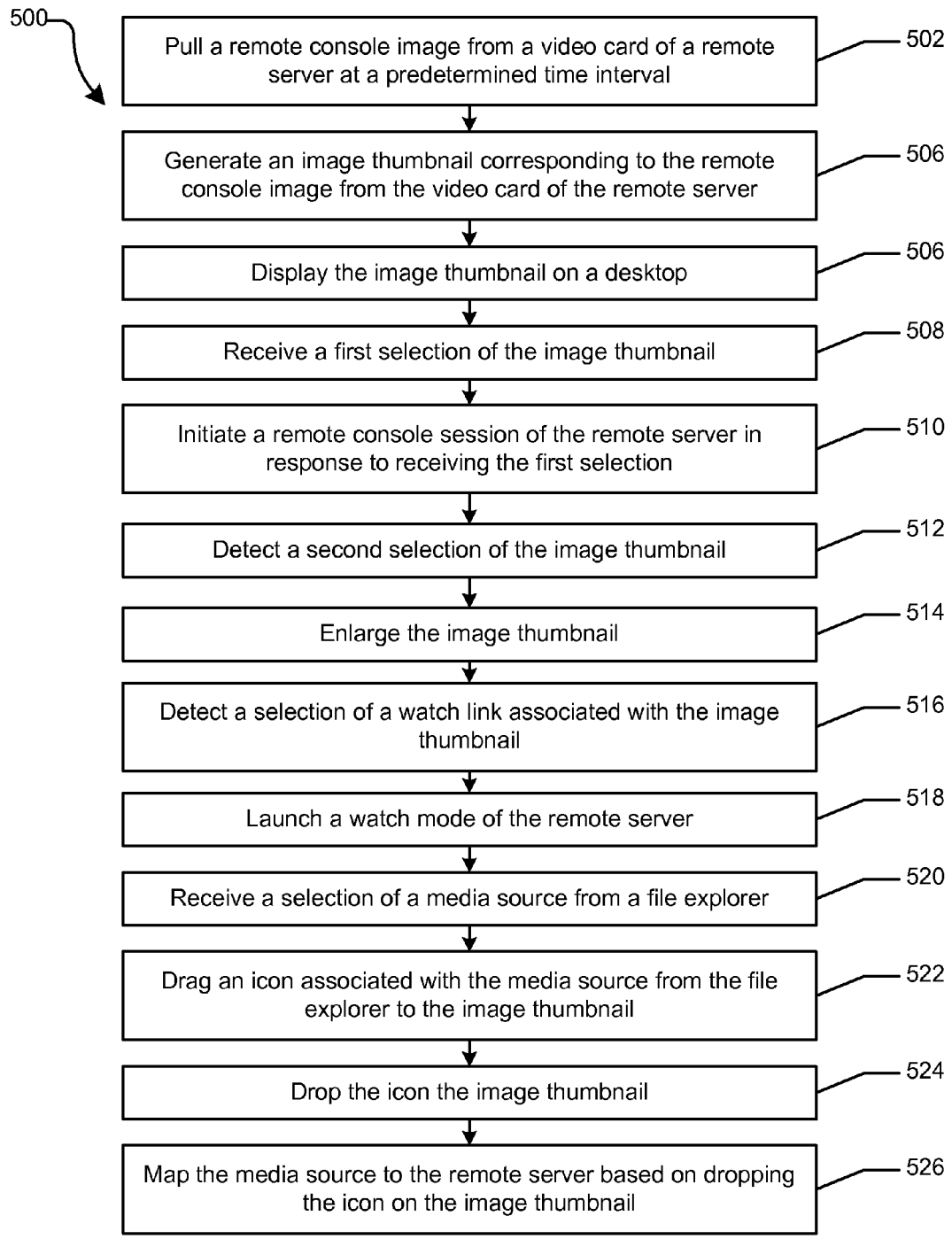
FIG. 5 is a flow diagram of an alternative method for launching the remote console session of the server.

FIG. 5 shows an alternative method 500 for launching a remote console session of a remote server. At block 502, a remote console image is pulled from a video card of the remote server at a predetermined interval. An image thumbnail corresponding to the remote console image is generated at block 504. The image thumbnail can be similar to the remote console image except that the image thumbnail can have smaller dimensions than the remote console image. At block 506, the image thumbnail is displayed on a GUI of a computer display. At block 508, a first selection of the image thumbnail is received. A remote console session of the server is initiated in response to receiving the first selection of the image thumbnail at block 510. At block 512, a second selection of the image thumbnail is detected. The image thumbnail is enlarged in response to detecting the second selection of the image thumbnail at block 514. The second selection of the image thumbnail can be a graphical representation of a pointing device dwelling over the image thumbnail for a predetermined amount of time, such as five seconds, ten seconds, and the like.

At block 516, a selection of a watch link associated with the image thumbnail is detected. A watch mode of the remote console image of the remote server is launched in response to the selection of the watch link at block 518. At block 520, a selection of a media source from a file explorer is received. The media source can be a drive located on the user's computer, such as an internal hard disk drive, a USB drive, a CD drive, and the like. An icon associated with the media source in the file explorer is dragged to the image thumbnail at block 522. At block 524, the icon is dropped on the image thumbnail. The media source is mapped to the remote server based on dropping the icon on the image thumbnail at block 526.

Figure 6:
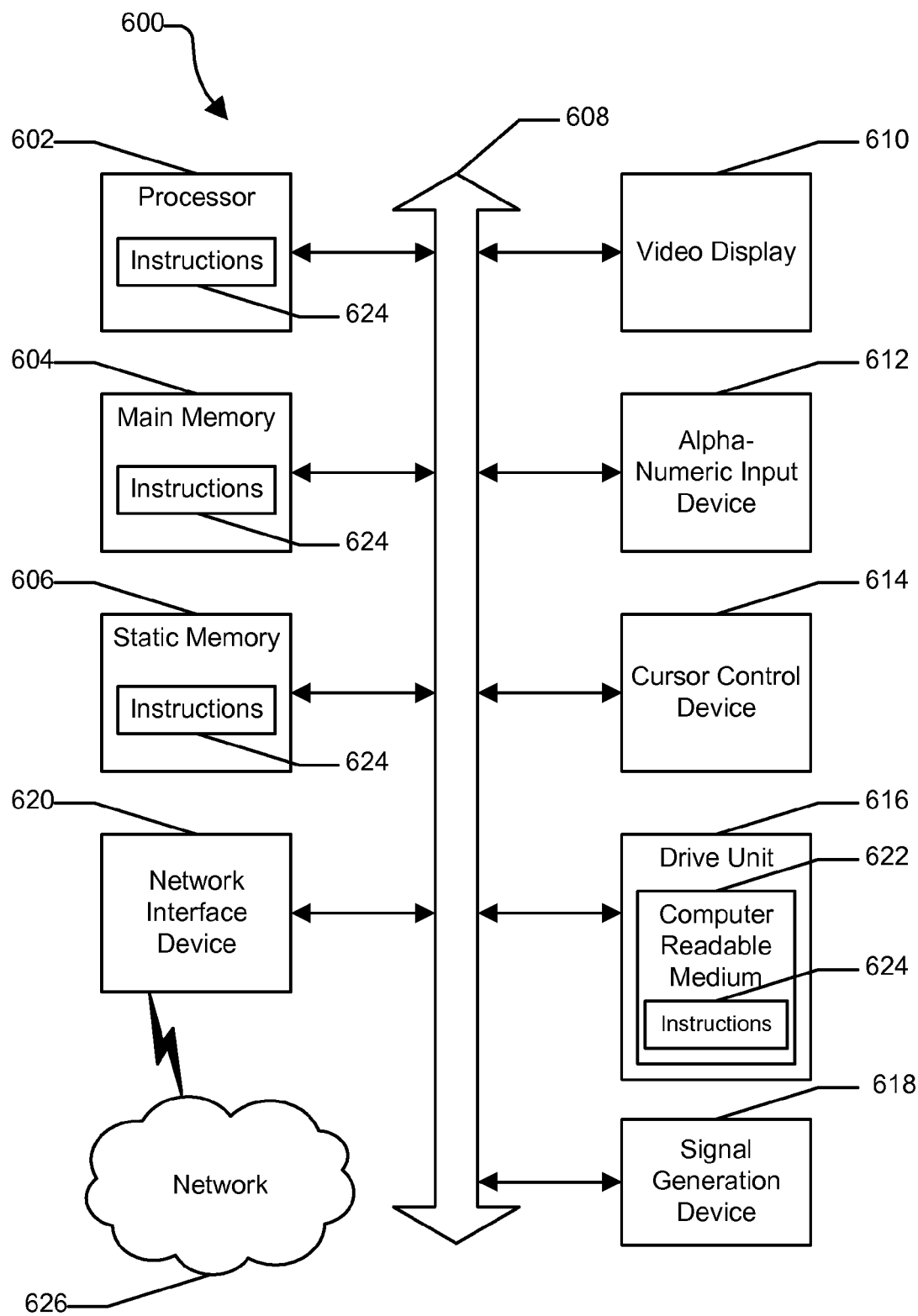
FIG. 6 is a block diagram of a general computer system.

FIG. 6 shows an illustrative embodiment of a general computer system 600 in accordance with at least one embodiment of the present disclosure. The computer system 600 can include a set of instructions that can be executed to cause the computer system to perform any one or more of the methods or computer based functions disclosed herein. The computer system 600 may operate as a standalone device or may be connected such as using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

The computer system 600 may include a processor 602 such as a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624 such as software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media. The network interface device 620 can provide connectivity to a network 626, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   displaying a preview image corresponding to a remote console image from a video card of a remote server, wherein the preview image is an image thumbnail that provides a preview of a current output of the video card and a visual indication of the status of the remote server;
   displaying a recent logged event menu to provide a list of recent events associated with the remote server, wherein events in the list of recent events includes a remote server error message, a remote server warning message, a remote server update message, or any combination thereof;
   updating the preview image at a predetermined time interval;
   receiving a first selection of the preview image; and
   initiating a remote console session of the remote server in response to receiving the first selection of the preview image.

2. The method of claim 1 further comprising:
   detecting a second selection of the preview image; and
   enlarging the preview image corresponding to the remote console image.

3. The method of claim 2 wherein the second selection is a graphical representation of a pointing device dwelling over the preview image.

4. The method of claim 1 further comprising:
   detecting a selection of a watch link associated with the preview image; and
   launching a watch mode of the remote server associated with the preview image.

5. The method of claim 4 wherein the watch mode of the remote server enables the preview image to be updated without any interaction from a graphical user interface of a client.

6. The method of claim 1 further comprising:
   receiving a selection of a media source from a file explorer;
   dragging an icon associated with the media source from the file explorer to the preview image;
   dropping the icon on the preview image; and
   mapping media source to the remote server associated with the preview image based on dropping the icon on the preview image.

7. A method comprising:
   pulling a remote console image from a video card of a remote server at a predetermined time interval;
   generating an image thumbnail corresponding to the remote console image from the video card of the remote server, wherein the image thumbnail provides a preview of a current output of the video card and a visual indication of the status of the remote server;
   displaying the image thumbnail on a graphical user interface of a computer display;
   receiving a first selection of the image thumbnail; and
   initiating a remote console session in response to receiving the first selection of the image thumbnail.

8. The method of claim 7 further comprising:
   detecting a second selection of the image thumbnail on the graphical user interface of the computer display; and
   enlarging the image thumbnail corresponding to the remote console image on the graphical user interface of the computer display.

9. The method of claim 8 wherein the second selection is a graphical representation of a pointing device dwelling over the image thumbnail.

10. The method of claim 7 further comprising:
    detecting a selection of a watch link associated with the image thumbnail; and
    launching a watch mode of the remote server associated with the image thumbnail.

11. The method of claim 10 wherein the watch mode of the remote server enables the image thumbnail to be updated without any interaction from the graphical user interface of the computer display.

12. The method of claim 7 further comprising:
    receiving a selection of a media source from a file explorer;
    dragging an icon associated with the media source from the file explorer to the image thumbnail;
    dropping the icon on the image thumbnail; and
    mapping the media source to the remote server associated with the image thumbnail based on dropping the icon on the image thumbnail.

13. The method of claim 1 further comprising:
    providing an Internet Protocol address associated with a last user to log on to the remote server, and a time and date of a last log on to the remote server.

14. A device comprising:
    a remote access controller configured to receive a remote console image from a video card of a remote server, the remote access controller including:
    a graphical user interface including a preview image corresponding to the remote console image from a video card of the remote server, wherein the preview image is an image thumbnail that provides a preview of a current output of the video card and a visual indication of the status of the remote server, the graphical user interface configured to initiate a remote console session of the remote server in response to receiving a first selection of the preview image, and further configured to map a media source to the remote server based on an icon associated with the media source being dropped on the preview image.

15. The device of claim 14 wherein the graphical user interface is further configured to enlarge the preview image corresponding to the remote console image in response to detecting a second selection of the preview image.

16. The device of claim 15 wherein the second selection is a graphical representation of a pointing device dwelling over the preview image.

17. The device of claim 14 wherein the graphical user interface is further configured to launch a watch mode of the remote server associated with the preview image in response to detecting a selection of a watch link associated with the preview image.

18. The device of claim 17 wherein the watch mode of the remote server enables the preview image to be updated without any interaction from the client.

19. The device of claim 14 wherein the media source is selected from a group consisting of an internal hard disk drive, an universal serial bus drive, a compact disc drive.

20. The device of claim 14 wherein the graphical user interface is further configured to enable the icon associated with the media source to be selected from a file explorer and virtually pulled across the graphical user interface to the preview image, and to enable the icon to be virtually dropped on the preview image.

* * * * *